United States Patent
Ohsawa

(10) Patent No.: US 8,154,626 B2
(45) Date of Patent: Apr. 10, 2012

(54) IMAGING APPARATUS HAVING ENHANCED ZOOM OPERATION

(75) Inventor: Hiroyuki Ohsawa, Chiba (JP)

(73) Assignee: Canon Kabushiki Kaisha, Tokyo (JP)

( * ) Notice: Subject to any disclaimer, the term of this patent is extended or adjusted under 35 U.S.C. 154(b) by 487 days.

(21) Appl. No.: 12/189,274

(22) Filed: Aug. 11, 2008

(65) Prior Publication Data

US 2009/0051789 A1 Feb. 26, 2009

(30) Foreign Application Priority Data

Aug. 22, 2007 (JP) .................................. 2007-215622

(51) Int. Cl.
*H04N 5/262* (2006.01)
(52) U.S. Cl. .................................................... 348/240.2
(58) Field of Classification Search ............... 348/240.2, 348/240.99
See application file for complete search history.

(56) References Cited

U.S. PATENT DOCUMENTS

| | | | | |
|---|---|---|---|---|
| 5,223,877 A * | 6/1993 | Kawasaki et al. | ................ | 396/87 |
| 5,434,621 A * | 7/1995 | Yu | ................... | 348/347 |
| 6,163,341 A * | 12/2000 | Kawaguchi et al. | ........... | 348/357 |
| 7,388,720 B2 * | 6/2008 | Okawara | ........................ | 359/696 |
| 7,738,016 B2 * | 6/2010 | Toyofuku | .................... | 348/240.1 |
| 7,742,624 B2 * | 6/2010 | Super et al. | .................... | 382/106 |
| 2005/0086704 A1 * | 4/2005 | Rhodes et al. | ................. | 725/136 |

FOREIGN PATENT DOCUMENTS

JP 04-175711 A 6/1992

* cited by examiner

*Primary Examiner* — Lin Ye
*Assistant Examiner* — Amy Hsu
(74) *Attorney, Agent, or Firm* — Canon USA Inc IP Division

(57) ABSTRACT

An imaging apparatus includes a zoom operation unit operable to perform a zoom operation, an extraction unit configured to extract a main object from an captured image plane, and a control unit configured to control a zoom speed by using the size of a region occupied by the main object with respect to the captured image plane and operation information of the zoom operation unit.

9 Claims, 7 Drawing Sheets

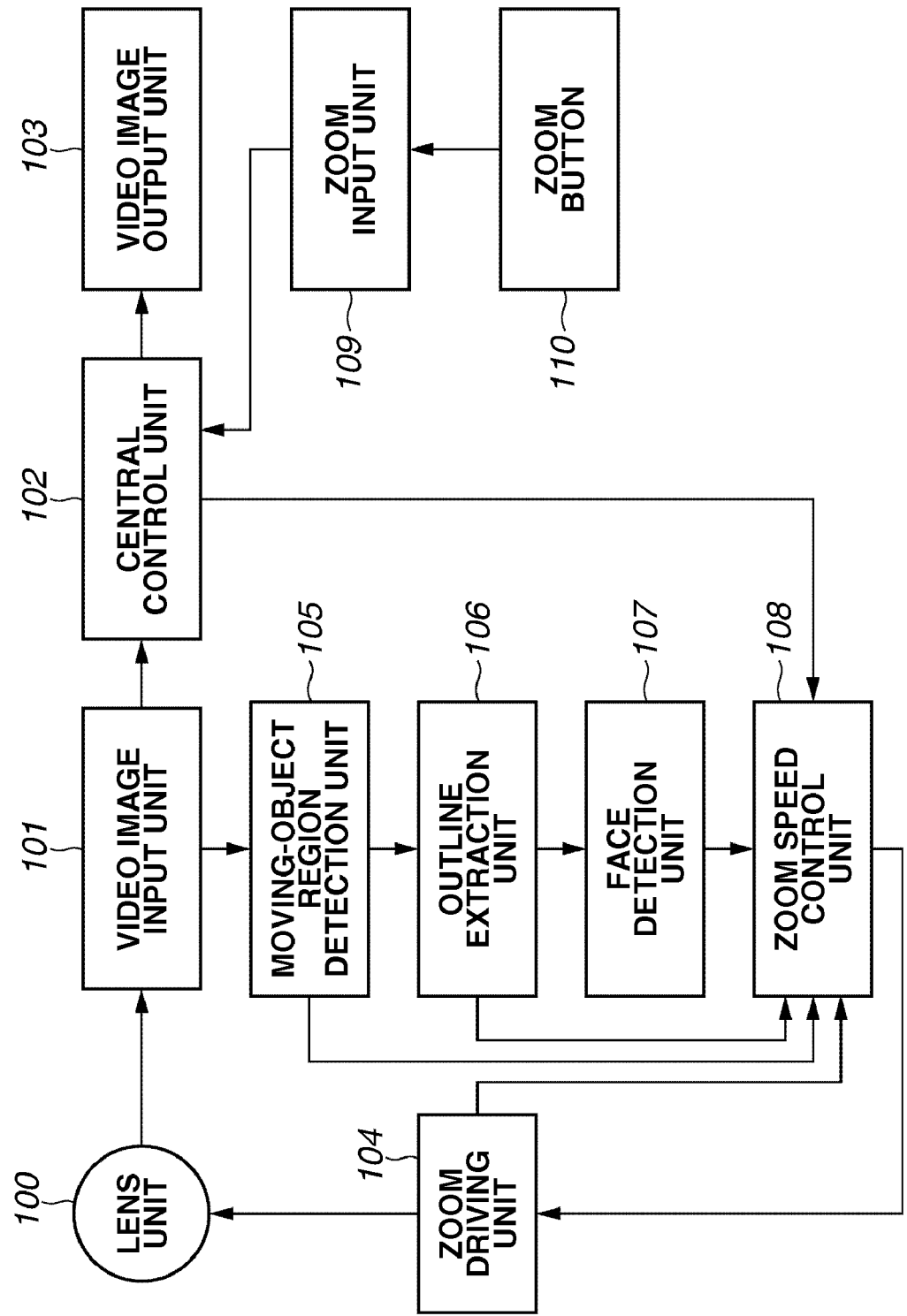

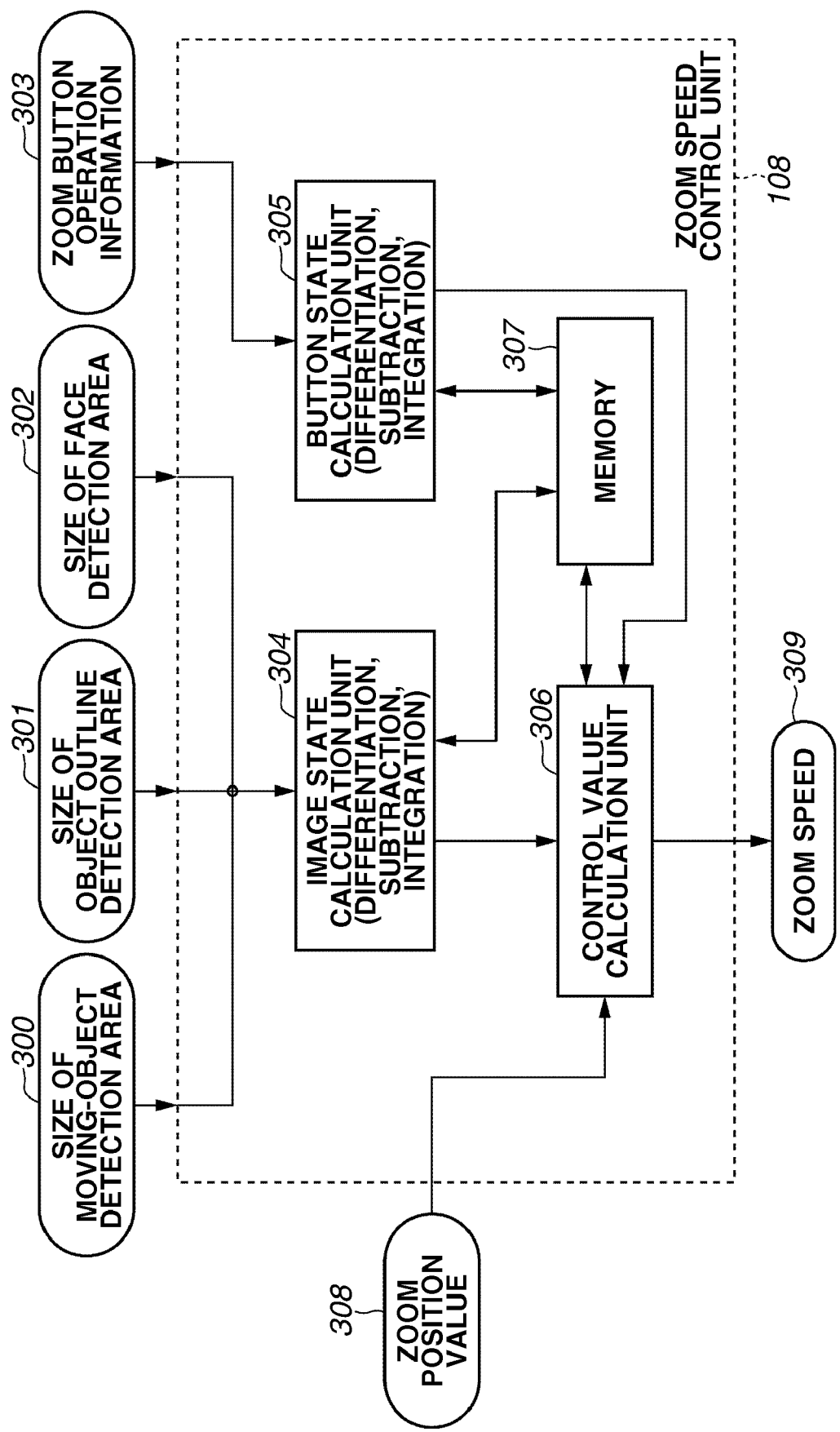

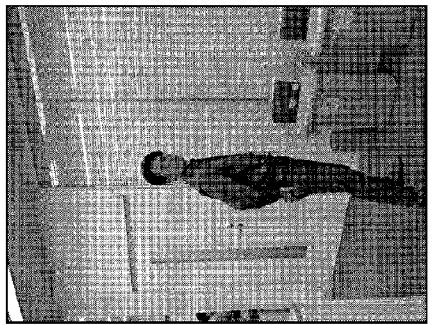
FIG.4A CAPTURED IMAGE
FIG.4D REGION IMAGE OBTAINABLE BY FACE RECOGNITION
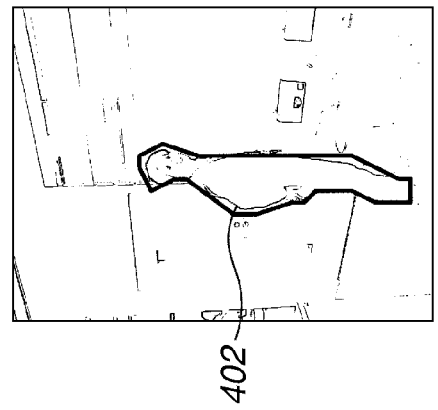
FIG.4C REGION IMAGE OBTAINABLE BY OUTLINE EXTRACTION
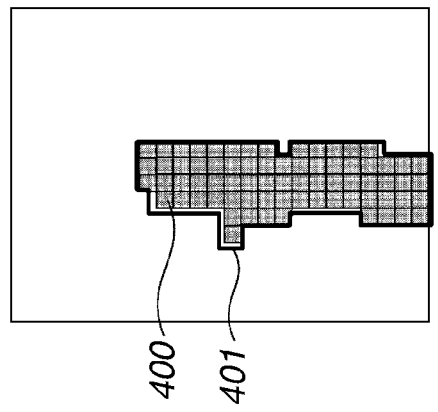
FIG.4B OBJECT REGION IMAGE DETERMINED BY MOTION

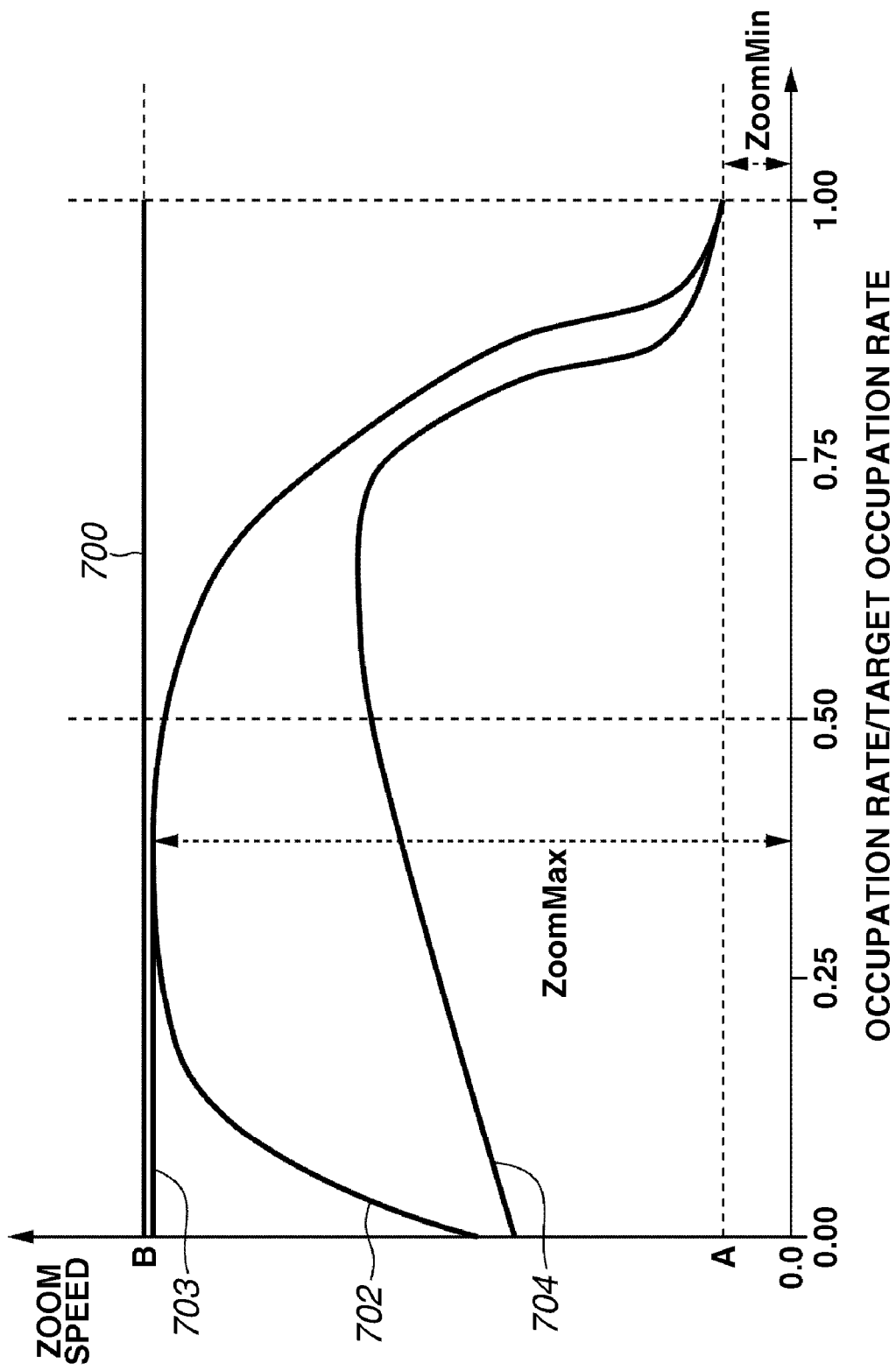

IMAGING APPARATUS HAVING ENHANCED ZOOM OPERATION

BACKGROUND OF THE INVENTION

1. Field of the Invention

The present invention relates to imaging apparatuses such as digital cameras and video cameras.

2. Description of the Related Art

Imaging apparatuses such as digital cameras and video cameras have become widely used in homes and offices. Each of the imaging apparatuses is configured to include a zoom function, thereby being capable of placing an object image in a telephoto state or in a wide-angle state according to a photographer's zoom operation. That is, according to the zoom operation, the object image of a desired size can be freely placed within an image plane to thereby photograph the object. Also, a better zoom operation can be realized by changing the zoom speed according to a photographing state to a high speed mode or a low speed mode at a photographer's choice (Japanese Patent Application Laid-Open No. 04-175711).

According to the conventional imaging apparatuses, there is, however, such a case where the zoom speed is determined by selecting a zoom speed mode or by an operation way of the zoom button. Therefore, in the case of a photographer who is unaccustomed to the zoom operation, an excessive zoom operation may be done by the photographer, which invites a visually undesirable image to be photographed because of excessive zooming with regard to an object.

SUMMARY OF THE INVENTION

The present invention is directed to an imaging apparatus capable of photographing an image in a natural zoom work even if a photographer who is unaccustomed to a zoom operation operates a zoom operation unit.

According to an aspect of the present invention, an imaging apparatus includes a zoom operation unit operable to perform a zoom operation, an extraction unit configured to extract an object from a captured image, and a control unit configured to control zooming based on an operation of the zoom operation unit, wherein the control unit is configured to control a zoom speed corresponding to the operation of the zoom operation unit such that the zoom speed becomes lower as a region occupied by the object extracted by the extraction unit with respect to the captured image becomes larger.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIG. 1 is a block diagram illustrating an example configuration of a video camera according to a first embodiment of the present invention.

FIG. 3 is a detailed block diagram illustrating a zoom speed control unit illustrated in FIG. 1.

FIGS. 4A, 4B, 4C, and 4D are views illustrating how to specify an object region or the like from a captured image according to the first embodiment.

FIG. 6 is a chart illustrating an example of a zoom speed control operation according to the first embodiment.

DETAILED DESCRIPTION OF THE EMBODIMENTS

Figure 2A:
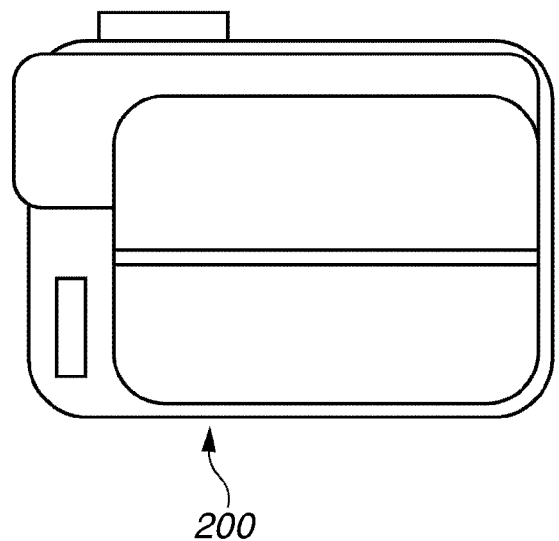
FIGS. 2A, 2B, and 2C are external views of the video camera illustrated in FIG. 1.

Various exemplary embodiments, features, and aspects of the invention will be described in detail below with reference to the drawings.

First Exemplary Embodiment

FIG. 1 is a block diagram illustrating a configuration of a video camera as an example of an imaging apparatus according to a first embodiment of the present invention. The video camera includes a lens unit 100, a video image input unit 101, a central control unit 102, and a video image output unit 103. The video camera further includes a zoom driving unit 104, a moving-object region detection unit 105, an outline extraction unit 106, a face detection unit 107, a zoom speed control unit 108, a zoom input unit 109, and a zoom button 110.

The lens unit 100 is an imaging optical system, normally installed in a video camera, including a zoom optical system movable in an optical axis direction driven by the zoom driving unit 104 to perform optical zoom control. The video image input unit 101 includes an optical conversion element, such as a charge-coupled device (CCD) sensor or a complementary metal-oxide semiconductor (CMOS) sensor that photoelectrically converts an optical signal to an electric signal. Then, the video image input unit 101 converts the electric signal into a digital signal. Thus, a digitalized image signal is output to the video image output unit 103 after the central control unit 102 performs an encoding process and adds management information. The video image output unit 103 writes the image signals to an image recording device such as a digital versatile (DVD) disc, a Blue-ray (BD) disc, a High Definition (HD) DVD disc, or a memory medium such as a Secure Digital (SD) memory, or a tape medium.

A photographer handling the video camera can control zoom to an intended view-angle by operating the zoom button 110. Operation information of the zoom button 110 operated by the photographer is read by the central control unit 102 via the zoom input unit 109 and is used as a parameter for calculating the zoom speed, thereby controlling zooming, as described below.

The moving-object region detection unit 105, the outline extraction unit 106, and the face detection unit 107 are provided for image recognition. These units serve to grasp a rough region where an object exists, extract an outline of the object, and distinguish each object to extract it. Thus, they can recognize whether a face is included in the extracted object. Also, they can detect the size of the object on the image plane. The detected size of the object on the image plane (hereinafter, also referred to as the "captured image") and the operation information of the zoom button 110 held by the central control unit 102 are used for the calculation of the zoom speed by the zoom speed control unit 108.

The zoom speed control unit 108 detects the size or the like of the object on the image plane to determine the zoom speed in consideration of the probability of excessive zooming. Then, the zoom driving unit 104 performs zoom control. The zoom driving unit 104 notifies a zoom position value to the zoom speed control unit 108. Feedback control becomes possible with the zoom position value to thereby achieve optimum zoom speed control.

With the above-described configuration, the video camera can determine the optimum zoom speed based on the size of the object on the image plane and the operation state of the zoom button 110.

Figure 2B:
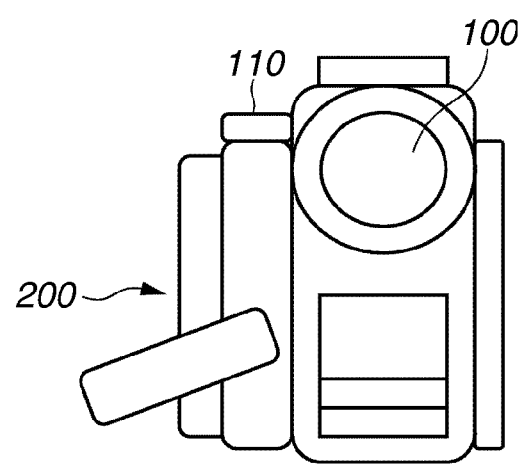
Figure 2C:
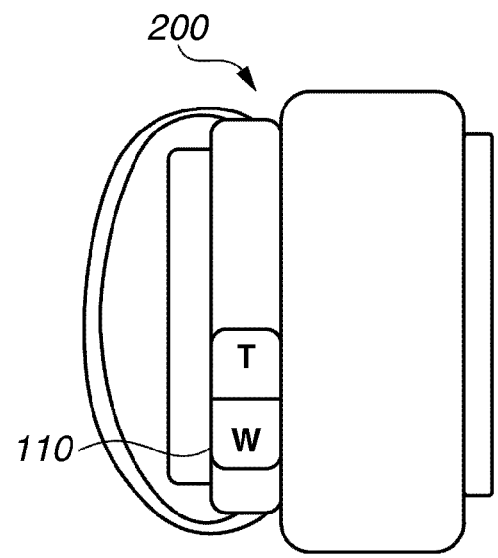

FIGS. 2A, 2B, and 2C are external views of a video camera with the above-described configuration. More specifically, FIG. 2A is a side view of the video camera, FIG. 2B is a front view of the video camera, and FIG. 2C is a top view of the video camera.

The video camera 200 includes the zoom button 110 at a position illustrated in FIGS. 2B and 2C. The video camera 200 also includes the lens unit 100 at a position illustrated in FIG. 2B. Using an electric signal, the zoom speed can be varied.

FIG. 3 is a block diagram illustrating the zoom speed control unit 108 illustrated in FIG. 1 and a configuration thereabound. The zoom speed control unit 108 includes an image state calculation unit 304, a button state calculation unit 305, a control value calculation unit 306, and a memory 307. The zoom speed control unit 108 calculates the zoom speed based on various parameters.

These various parameters include the size of a moving-object detection area 300, the size of an object outline detection area 301, the size of a face detection area 302, zoom button operation information 303, and a zoom position value 308 at the present state for the feedback control.

Now, an example configuration of each of the above parameters will be described below.

The above-described size of the moving-object detection area 300 corresponds to a moving portion of the image and is calculated by the moving-object region detection unit 105 illustrated in FIG. 1. Further, the size of the object outline detection area 301 is calculated by the outline extraction unit 106 illustrated in FIG. 1. Further, the size of the face detection area 302, which is the size of a face region, obtained from the result of face detection is calculated by the face detection unit 107 illustrated in FIG. 1. Further, the operation amount of the zoom button 110 operated by the photographer, that is the zoom button operation information 303 representing, for example, a 70% pressing amount, is calculated by the central control unit 102 illustrated in FIG. 1. Still further, the zoom position value 308 is calculated by the zoom driving unit 104 illustrated in FIG. 1. Then, the calculated results are output to the zoom speed control unit 108.

In addition, the zoom position value 308 is the value indicating the detected present position of the zoom lens. With the value, the present zoom state is grasped to perform feedback control based on Proportional Integral Derivative (PID) control.

The size of the moving-object detection area 300 is the portion calculated based on the moving portion on the image plane (motion compensation) which is calculated at Moving Picture Experts Group 2 (MPEG-2) encoding and H.264 encoding. The size of the moving-object detection area 300 represents the portion where the image is moving. There is a case that the portion where the image is moving is composed from one object. However, in many cases, the portion is composed from a plurality of objects.

The size of the object outline detection area 301 is represented by the value of the size of the specified object in the captured image which is recognized by the outline extraction unit 106 among a plurality of objects, for example, when the plurality of objects are detected by the moving-object region detection unit 105.

When the object is a person, the size of the face detection area 302 is detected and transmitted to the zoom speed control unit 108.

The zoom button operation information 303, which is information representing the operation state of the zoom button 110 when the photographer operates the zoom button 110, is supplied to the zoom speed control unit 108.

The control value calculation unit 306 calculates the zoom speed 309 via the image state calculation unit 304 and a button state calculation unit 305 to perform zoom control.

Now, the outline of a calculation process of the zoom speed 309 will be described below.

The image state calculation unit 304 in the zoom speed control unit 108 calculates the occupation rate of the object region relative to the captured image. The image state calculation unit 304 adds a time element in a differentiation, a subtraction, and an integration. The obtained result is used, for example, to vary the zoom speed in the case where the zoom button is kept pressed for a long time.

Also, the button state calculation unit 305 calculates the operation information of the zoom button 110, such as a continuous pressing time of the zoom button 110 and a pressing strength of the zoom button 110. The control value calculation unit 306 calculates the zoom speed 309 based on the values calculated above. Further, the feedback control calculation is performed based on the zoom position value 308. Still further, since calculation, in which past states are taken into consideration, can be performed by recording the value variation of the zoom button 110 in the memory 307. The calculation equation will be described below in detail.

Herein below, values concerning the occupation rate calculation of the object will be described.

FIGS. 4A, 4B, 4C, and 4D are schematic views illustrating values to be input to the zoom speed control unit 108. FIG. 4A is an image corresponding to the captured image.

FIG. 4B is an image representing an object region determined based on the motion of the object (size of the moving-object detection area 300). The area obtained based on the determination of motion detection mainly upon encoding can be used as the object region. The motion detection portion input from an encoder of MPEG2 or H.264 is a continuous object region 401 composed of collective blocks of a block 400 as illustrated in FIG. 4B. The size of the moving-object detection area 300 is calculated by the moving-object region detection unit 105 based on the size of the object region 401. Then, the calculated size of the moving-object detection area 300 is input to the zoom speed control unit 108.

In addition, the size of the moving-object detection area 300 is not limited to the output from the encoder of MPEG2 or H.264, but may be obtained according to another method.

FIG. 4C is an image representing a region obtainable by an outline extraction area (size of an object outline detection area 301). The region is calculated by the outline extraction unit 106. The outline is extracted as follows considering a large calculation amount. More specifically, the size of the moving-object detection area 300 calculated by the moving-object detection unit 105 is used to reduce the calculation amount executed by the outline extraction unit 106. The calculation method of the outline extraction includes a method for extracting the outline by using a differentiation for each pixel.

As described above, it is possible to calculate the size of the object outline detection area 301 based on the obtained object outline 402. Then, the size of the object outline detection area 301 is input to the zoom speed control unit 108.

As illustrated in FIG. 4D, the region of the image is obtained by the face detection, and the size of the face detection area 302 is obtained. An algorithm of a feature detection of eyes, a noise, a mouth or the like can be used for the face detection algorithm. Alternatively, any other detection methods can be used. According to the present embodiment, the calculation amount for detecting the object outline can be reduced by detecting it from the region represented by the outline 402 extracted by the outline extraction unit 106. The obtained face detected portion 404 is calculated as the size of the face area 302. Then, the size of the face area 302 is input to the zoom speed control unit 108.

Next, the calculation algorithm of the zoom speed 309, performed by the control value calculation unit 306 in the zoom speed control unit 108, will be described below.

Figure 5A:
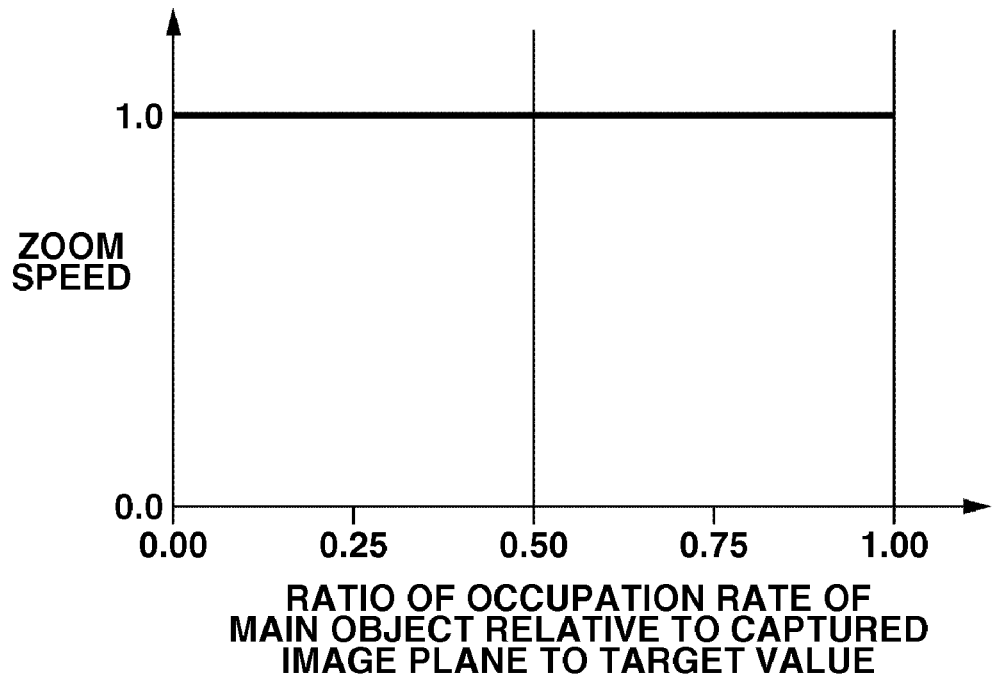
FIGS. 5A and 5B are charts illustrating examples of conventional zoom speed control operations.
Figure 5B:
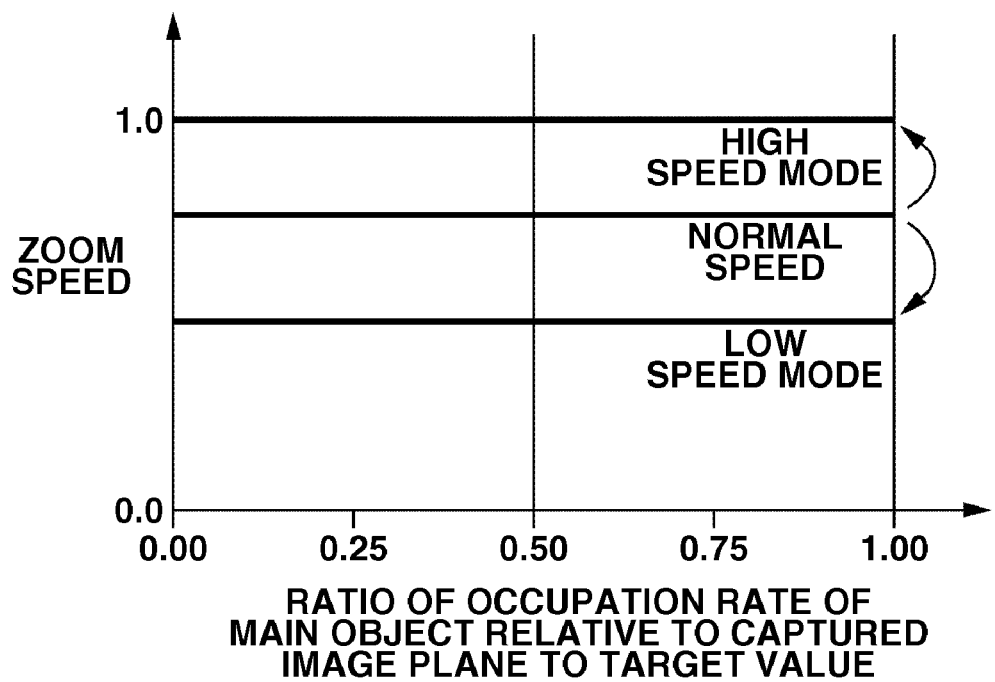

FIGS. 5A and 5B illustrate examples of the conventional zoom speed control. Examples of the conventional zoom speed control can be classified into the following examples 1 and 2 of the zoom speed control.

FIG. 5A illustrates an example 1 of the conventional zoom speed control of a constant zoom speed disregarding the size of the object. In this case, no consideration is given to the zoom speed. FIG. 5B illustrates an example 2 of the conventional zoom speed control of a method including some modes for varying the zoom speed. In this case, the photographer can select a high speed, a low speed, or a normal speed.

FIG. 6 is a chart illustrating an example of the zoom speed control according to the first embodiment of the present invention in brief. FIG. 6 illustrates a relationship of a zoom speed to an occupation rate of a region of the main object relative to the captured image. As apparent from FIG. 6, the occupation rate has a target value, and a ratio of the present occupation rate relative to the occupation rate of the target value is calculated. The zoom speed is controlled between a zoom speed A and a zoom speed B. Now, the occupation rate is calculated based on the size of the moving-object detection area 300, the size of the object outline detection area 301, and the size of the face detection area 302. The occupation rate will be described below in detail.

The conventional video cameras adopt a zoom speed disregarding the occupation rate, as shown by a line 700 (example 1 of the conventional control).

To the contrary, the present invention adopts a zoom speed varying according to the occupation rate of a main object relative to the captured image, as indicated by a curved line 702 (example 1 of control according to the first embodiment). In accordance with the curved line 702 representing the variable zoom speed, the zoom speed varies according to the occupation rate of the main object. As the occupation rate of the main object relative to the captured image becomes higher, the zoom speed becomes lower. In the curved line 702, when the occupation rate is lower than a target value, for example, lower than a ratio of 0.25%, the zoom speed becomes higher as the occupation rate becomes larger. This is for preventing an image from being unnatural due to high-speed zooming in response to the photographer's zoom operation.

In accordance with curved lines 703 and 704, when the occupation rate is high, the zoom speed is lowered as the occupation rate of the main object becomes higher relative to the image plane.

In addition, when the zoom button 110 is kept pressed even after the occupation rate of the main object reaches the target value, zoom control is continuously performed as illustrated in FIG. 6. That is, the zoom control is performed with a zoom speed ZoomMin. Then, the lens unit keeps moving until a zoom position thereof reaches a zoom end.

In the first embodiment, the zoom speed is varied according to the occupation rate of the main object calculated based on the following calculation equation. Accordingly, operability of the zoom button 110 can be improved, thereby preventing an unnatural zoom operation due to an excessive high zoom speed.

A calculation example of the zoom speed is shown below. That is, a curved line of the variable zoom speed is represented by the following equations:

$$ZoomMin = ButtonTime \times K1 + ButtonPower \times K2$$

$$ZoomSp = ZoomMin + (ZoomMax \times ZoomCurve(ObjectRate))$$

where, ZoomSp is the zoom speed [mm/sec.], ZoomMax is the maximum value of the zoom speed, ZoomMin is the minimum value of the zoom speed, and ButtonTime is keeping time of pressing the zoom button [sec.]. Further, ButtonPower is the pressing strength of the zoom button [N/m$^2$], ObjectRate is the ratio of occupation rate of the main object relative to a captured image plane to the target value, and ZoomCurve, which is a function of the ObjectRate, is a zoom attenuation curve to the main object. In addition, K1 and K2 are zoom button effect coefficients.

The minimum value of the zoom speed (ZoomMin) is a parameter, not only for the zoom speed control by a self-determination of the video camera, but also for reflecting an operation state of the zoom button 110 by the photographer to the zoom speed. The zoom button effect coefficients K1 and K2 are constants for determining how much effect by the operation of the zoom button 110 is reflected to the zoom speed variation. The zoom button effect coefficient can determine whether a rate of the zoom speed control according to an image recognition of the video camera is enlarged, or, alternatively, a rate of the zoom speed control according to the photographer's zoom button operation is enlarged.

The minimum value of the zoom speed (ZoomMin) is calculated based on the keeping time of pressing the zoom button (ButtonTime) and the pressing strength of the zoom button (ButtonPower), and is determined according to the keeping time of pressing the zoom button 110 and the pressing strength of the zoom button 110. The zoom speed, when the ratio (ObjectRate) of the occupation rate of the main object relative to the captured image plane to the target value comes close to 1, is affected especially. This is because there is a case where the photographer wants to take a further telephoto operation even when the main object becomes large enough on the captured image plane to reach the target value according to the image recognition and, thus, the zoom speed determined based on the object size is set to 0.

According to the above calculation method, the zoom operation of the photographer is prioritized when the photographer's intended composition differs from the composition of the target value set by the video camera.

The zoom attenuation curve ZoomCurve for the main object is an original curved line for a curved line of the variable zoom speed, and is a function representing an attenuation ratio of the zoom speed with respect to the size of the main object.

The ObjectRate, which is the ratio of the occupation rate of the main object relative to the captured image plane to the target value, is calculated based on the following equation:

$$ObjectRate = ObjectArea \times I1 + ObjectOutline \times I2 + ObjectFace \times I3$$

where ObjectArea is the ratio of the moving-object detection area to the surface area of the image plane, and the ObjectOutline is the ratio of the object outline detection area in the moving-object detection area to the surface area of the image plane. Further, ObjectFace is the ratio of the face area in the object outline detection area to the surface area of the image plane, and I1, I2, and I3 are image recognition effect coefficients. The ObjectRate is calculated based on the size of the moving-object detection area 300, the size of the object outline detection area 301, and the size of the face detection area 302, which are recognized on the image plane.

The image recognition effect coefficients I1 through I3 can determine how to control the zoom speed by determining the sensitivity responding to each image recognition. In other words, by changing the image recognition effect coefficients I1 through I3, the effect of controlling the zoom speed with respect to the image recognition can be determined.

Functions having mutual relations to the actual zoom position of the lens unit may be utilized, instead of designating the coefficients, for the image recognition effect coefficients I1 through I3.

The calculation result of each of the moving-object region detection unit 105, the outline extraction unit 106, and the face detection unit 107 may be multiplied by a factor. By controlling such factors, such a zoom speed control of emphasizing the image-recognized size of the moving-object detection area 300, the size of the moving-object outline detection area 301, or the size of the face detection area 302 can be achieved.

Figure 7:
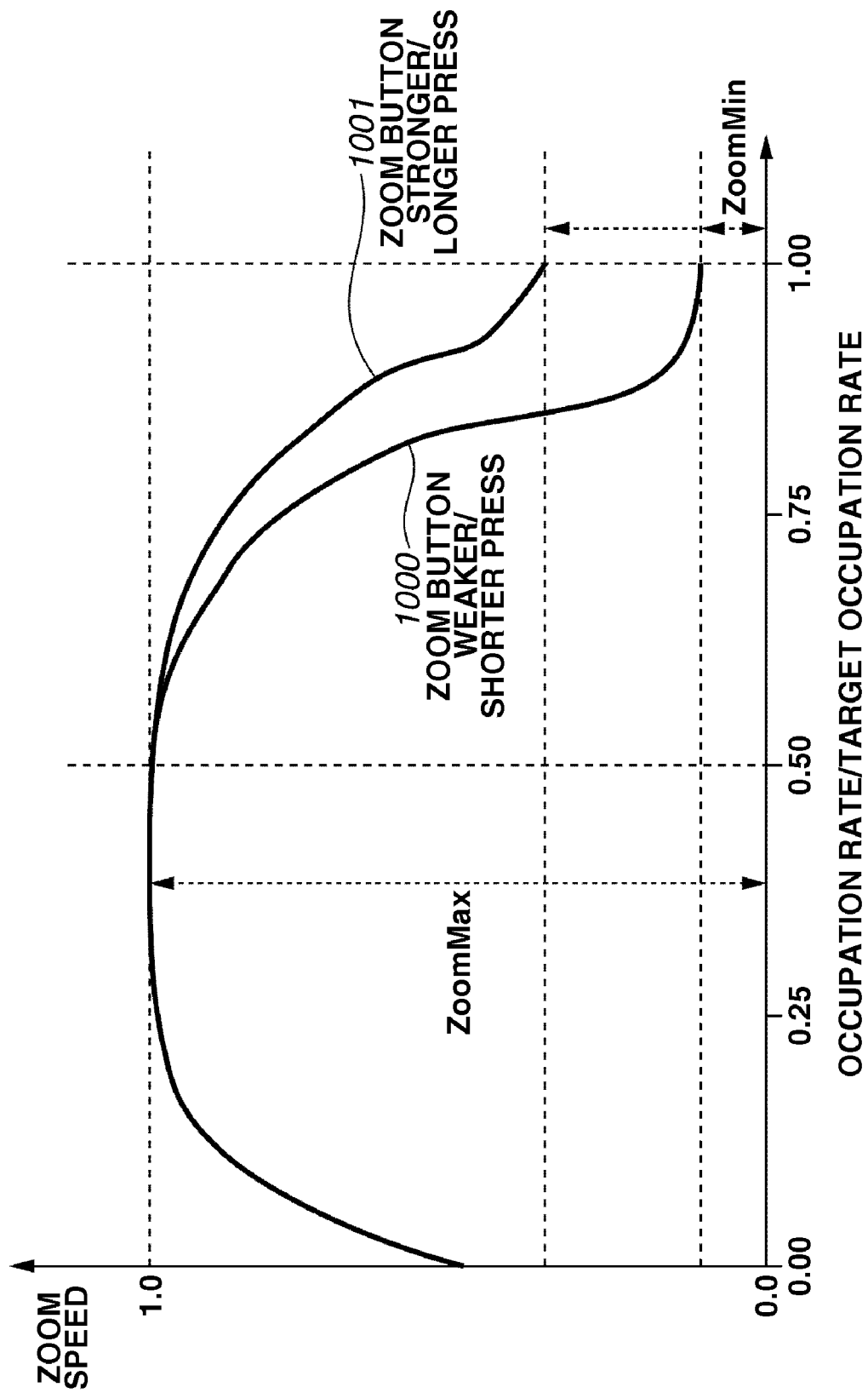
FIG. 7 is a chart illustrating an example of a zoom speed variation according to a zoom button operation according to a second embodiment of the present invention.

FIG. 7 is an exemplary chart of zoom speed control considering the size of the main object that actually varies in association with the operation of the zoom button 110. FIG. 7 illustrates an example of the zoom speed varied by operation of the zoom button 110.

The zoom speed 309 is calculated based on the curved line of the variable zoom speed calculated by the above-described equation. Further, when the zoom button 110 is pressed weak or the zoom button 110 is kept pressed for a short time, ZoomMin varies to form a curved line as represented by a curved line 1000. Still further, when the zoom button 110 is pressed strong or the zoom button 110 is kept pressed for a long time, ZoomMin varies to form a curved line as represented by a curved line 1001. The curved line 1001 takes a larger value than the curved line 1000 with regard to values of ZoomMin.

More specifically, when the video camera is placed in the telephoto state and the occupation rate of the main object on the captured image plane becomes higher, the zoom speed is lowered. On the other hand, when the zoom button 110 is pressed strong or the zoom button 110 is pressed for a long time, it is controlled that the zoom speed is hardly lowered. Accordingly, the zoom speed is determined by the video camera to be an intended zoom speed by a photographer via the zoom button 110.

The present invention can be applied not only to video cameras but also to digital cameras.

Second Exemplary Embodiment

Contrary to the function ZoomCurve in the first embodiment, a second embodiment utilizes different functions in a telephoto action and in a wide-angle action, respectively.

Different curved lines are used for the telephoto action (zoom in the telephoto direction) and for the wide-angle action (zoom in the wide-angle direction), respectively, as the functions ZoomCurve according to the second embodiment. Accordingly, zooming out of an object can be performed with a faster zoom speed in a zooming movement in the wide-angle direction than in a zooming movement in the telephoto direction.

In the above case, the following condition is required between the function ZoomCurve for the telephoto operation and the function ZoomCurve for the wide-angle operation:

$$\text{ZoomCurve(ObjectRate) in the telephoto direction operation} \leqq \text{ZoomCurve(ObjectRate) in the wide-angle direction operation.}$$

According to the above operation, when the photographing state of the object is switched from the present state to the state of operation in the wide-angle direction, more natural frame work can be achieved than a frame work performed with only one function ZoomCurve which provides an unnatural frame work.

Further, when the photographer wants a zoom speed in the wide-angle direction lower than a zoom speed in the telephoto direction, an equation satisfying the following condition can be used:

$$\text{ZoomCurve(ObjectRate) in the telephoto direction operation} \geqq \text{ZoomCurve(ObjectRate) in the wide-angle direction operation.}$$

As described in the second embodiment, the zoom speed in the telephoto direction operation and the zoom speed in the wide-angle direction operation can be changed by preparing a plurality of functions ZoomCurve. Accordingly, the photographer's operability of the zoom button can be further improved.

In the first and the second embodiments, the object to be photographed is recognized and then the zoom speed is determined based on the size (area) of the object within the captured image plane and the operation information of the zoom button 110. More specifically, the imaging apparatus according to the first embodiment includes the zoom button 110 for the zoom operation. The imaging apparatus according to the first embodiment further includes the moving-object region detection unit 105 configured to extract an object to be photographed from the captured image. The imaging apparatus according to the first embodiment still further includes the zoom speed control unit 108 configured to control the zoom speed using the size of the main object occupied within the captured image plane and the operation information of the zoom button 110.

Accordingly, an imaging apparatus, such as a video camera, capable of preventing a visually undesirable image of the object due to an excessive zooming operation from being photographed and capable of performing a good work even for a beginner who is unaccustomed to the zoom operation, can be obtained.

The above-described extraction unit additionally includes the outline extraction unit 106 configured to extract an object by extracting an outline of the object and the face detection unit 107 configured to recognize a face of a person in the object to be photographed, when the object to be photographed is determined. Accordingly, detection accuracy of the object as a subject the photographer wants to take can be improved.

Further, the zoom speed control unit 108 is configured to control the zoom speed such that the zoom speed becomes lower as the size of the main object occupied within the captured image plane becomes larger. Accordingly, the photographer would not fail to photograph the main object due to a fast zoom speed. Also, the zooming operability is improved by not stopping the zoom control, while the photographer operates the zoom button 110, until the lens reaches the maximum zoom position (ZoomMax) or the minimum zoom position (ZoomMin).

Further, the operation information of the zoom button 110 is indicated by the continuous operation time or the pressing strength of the zoom button 110.

Still further, different control operations of the zoom speed are employed depending on whether it is in the telephoto action or in the wide-angle action, respectively, to improve the operability of the photographer's zoom button operation.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2007-215622 filed on Aug. 22, 2007, which is hereby incorporated by reference herein in its entirety.

What is claimed is:

1. An imaging apparatus comprising:
    a zoom operation input unit manually operable by a user, via a zoom button, to perform a zoom operation;
    an extraction unit configured to extract an object from a captured image; and
    a control unit configured to control zooming based on a manual zoom operation input by the user via the zoom button;
    wherein the control unit is configured to control a zoom speed corresponding to the zoom operation input by the user such that the zoom speed becomes lower as a region occupied by the object extracted by the extraction unit with respect to the captured image becomes larger.

2. The imaging apparatus according to claim 1, wherein the extraction unit is configured to extract the object from the captured image by performing an outline extraction or a face detection.

3. The imaging apparatus according to claim 1, wherein the extraction unit is configured to extract the object from the captured image by using a difference from another image.

4. The imaging apparatus according to claim 1, wherein the zoom speed control at a telephoto action is similar to that at a wide-angle action.

5. The imaging apparatus according to claim 1, wherein the zoom speed control at a telephoto action is different from that at a wide-angle action.

6. A method for controlling an imaging apparatus including a zoom operation input unit that is manually operable by a user, via a zoom button, to perform a zoom operation, the method comprising:
    extracting an object from a captured image;
    controlling zooming based on a manual zoom operation input by the user via the zoom button; and
    controlling a zoom speed corresponding to the zoom operation of input by the user such that the zoom speed becomes lower as a region occupied by the extracted object with respect to the captured image becomes larger.

7. The imaging apparatus according to claim 1, further comprising a zoom speed control unit which calculates the zoom speed based on (1) the size of a moving-object detection area, (2) the size of an object outline detection area, (3) the size of a face detection area, (4) zoom button operation information, and (5) a zoom position value 308.

8. The imaging apparatus according to claim 1,
    wherein zoom button operation information, representing an operation state of the zoom button when operated by the user, is provided to a button state calculation unit which calculates operation information of the zoom button, and
    wherein the operation information, along with a zoom position value, are received by a control value calculation unit which calculates zoom speed.

9. The imaging apparatus according to claim 1, wherein the operation state of the zoom button include a measurement of a continuous pressing time of the zoom button and a measurement of a pressing strength of the zoom button.

* * * * *